(12) United States Patent
Gordon

(10) Patent No.: US 6,336,553 B1
(45) Date of Patent: Jan. 8, 2002

(54) SOAP WRAPPERS

(75) Inventor: Todd Van Gordon, Basking Ridge, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 09/548,198

(22) Filed: Apr. 13, 2000

Related U.S. Application Data

(63) Continuation of application No. 09/327,063, filed on Jun. 7, 1999, now abandoned.

(51) Int. Cl.[7] .............................................. B65D 75/28
(52) U.S. Cl. .................................... 206/77.1; 229/87.06
(58) Field of Search ..................... 206/77.1; 229/87.06; 510/140, 439

(56) References Cited

U.S. PATENT DOCUMENTS

| | | | |
|---|---|---|---|
| 2,009,511 A | 7/1935 | Nydegger | |
| 2,155,668 A | 4/1939 | Little | |
| 2,163,228 A | * 6/1939 | Jorling ........................... | 87/23 |
| 2,233,207 A | 2/1941 | Gillam | |
| 2,267,310 A | * 12/1941 | Shearer et al. ................. | 252/93 |
| 2,722,361 A | 11/1955 | Kindseth | |
| 2,930,160 A | 3/1960 | Pohl | |
| 3,159,274 A | 12/1964 | Burt | |
| 3,260,359 A | 7/1966 | Willhite | |
| 3,329,258 A | 7/1967 | Brown | |
| 4,406,364 A | 9/1983 | Bronander, Jr. | |
| 4,754,874 A | 7/1988 | Haney | |
| 4,858,757 A | 8/1989 | Liggett | |
| 5,467,894 A | * 11/1995 | Altonen et al. ............ | 206/77.1 |
| 5,543,223 A | 8/1996 | Shah | |
| 5,863,885 A | 1/1999 | Ruggieri | |
| 6,048,829 A | * 4/2000 | Milio et al. .................. | 510/140 |

FOREIGN PATENT DOCUMENTS

| | | |
|---|---|---|
| CH | 221318 | 8/1942 |
| DE | L21120 III/33 C | 9/1956 |
| DE | 1914415 | 10/1970 |
| EP | 32/179 | 12/1988 |
| FR | 1439910 | 4/1966 |
| GB | 955039 | 4/1964 |
| GB | 1328353 | 8/1973 |
| JP | 57-85482 | 11/1980 |
| JP | 55-162473 | 11/1980 |
| JP | 64-9177 | 1/1989 |
| JP | 10-152179 | 6/1998 |
| WO | 99/07620 | 2/1999 |
| WO | WO 99/07620 | 2/1999 |

OTHER PUBLICATIONS

"Pest Proof Packing", D.M. Evans, B.Sc., F.R.E.S., Packaging And Display Encyclopaedia, pp. 378–379, George Newnes Ltd. 1948.

* cited by examiner

Primary Examiner—Jim Foster
(74) Attorney, Agent, or Firm—Michael J. McGreal

(57) ABSTRACT

Soap bars can be effectively packaged in substantially transparent materials so that the soap bar can be seen through the packaging material. This is particularly useful with decorative colored translucent soap bars. The soap bars first are at least partially enveloped in a first relatively thick and stiff substantially transparent film and then fully enveloped in a second relatively thin substantially transparent film. The soap bars are generally rectangular but with rounded edges and a shape that tapers in cross-section from a midpoint of the soap bar to the ends. The first film forms a substantially rectangular cylinder which envelops about 95% to about 105% of the soap bar. This rectangular cylinder is open at each end. The second film fully envelops the soap bar. The end package provides a soap bar maintained within a rectangular cylinder with a low fragrance loss and a moisture transmissivity of less than about 3 $gm/m^2/day$.

20 Claims, 3 Drawing Sheets

SOAP WRAPPERS

This is a continuation of prior application Ser. No. 09/327,063 filed on Jun. 7, 1999 which application is now abandoned and is incorporated herein by reference.

FIELD OF THE INVENTION

This invention relates to a soap bar that is generally rectangular in shape that is packaged in a substantially transparent package. More particularly, this invention relates to a substantially transparent package where said package provides enhanced functional properties.

BACKGROUND OF THE INVENTION

Soap bars traditionally are packaged in paperboard cartons, paper composites and paper composites with a paperboard stiffener. The paperboard in many instances will have a plastic barrier layer. The soap bars are often packed one bar to an overwrapper or carton. The carton provides a rectangular shape for stacking and protects the soap bar until later use. The overwrap and stiffener combination provide a less costly alternative to the carton and has poorer stability in a stack of single packs. These traditional packs have some disadvantages in that the end flaps and seals are not hermetic and allow migration of moisture and fragrance. This loss of water and fragrance from the bar reduces the storage life of the soap bars. In addition, paper soap bar packaging requires the use of mold inhibiting chemicals since moist paper and paperboard provides a good medium for mold growth. No such agents are needed with plastic packaging components.

A further disadvantage of cartons and paper composites is that the purchaser is not able to see the bar that is being purchased. This is fully corrected in the present invention with the use of transparent stiffener and wrapping films to make the package.

A paper composite is comprised of a paper layer along with one or more layers of alternative materials. The paper layer provides a stiff substrate to enhance decoration and strength and provides a surface for sealant deposition. The plastic films provide decoration features and moisture and fragrance barrier properties. The paper composite can be combined with a paperboard stiffener. A paperboard stiffener is a piece of paperboard which surrounds the soap bar except for the ends and provides protection for the soap bar. It also provides a place to make crisp wrapper folds and for good sealing and appearance. However, the paper stiffener will absorb moisture from the soap bar, soften and deform during distribution. Paper stiffeners generally have less stiffness than that of a plastic film of the same thickness and cannot provide the same degree of protection as plastic, particularly after they have absorbed moisture from the soap bar.

The prior art with regard to soap bar packages is exemplified by U.S. Pat. No. 4,406,364 and U.S. Pat. No. 5,098,012. In U.S. Pat. No. 4,406,364 there is disclosed a soap bar, a soap bar tray and a film overwrap. The soap bar tray is sufficient to store the bar during use. This tray surrounds the bar except of the top surface. Although the bar can be transparent or translucent, it is quite different from the present soap bar package. U.S. Pat. No. 5,098,012 discloses the state of the art of paper soap bar wrappers. The present plastic soap bar packages are an improvement over the packaging of this patent. U.S. Pat. No. 5,183,429 discloses transparent or translucent soap bars with a toy embedded in the soap bar. Such soap bars can conveniently be packaged in the present package which will allow the toy to be fully seen prior to purchase of the soap bar.

BRIEF SUMMARY OF THE INVENTION

In the present invention the soap bars are wrapped in at least two substantially transparent films. The soap bar is generally rectangular or ovoid in shape. This includes a rectangular saddle shaped bar. The soap bars have rounded edges and a major axis and a minor axis. The cross-section at a midpoint along the major axis will be greater than the cross-section adjacent the soap bar ends along the major axis. The soap bar is substantially enveloped with a first film which is relatively thick and is fully enveloped by a second relatively thin film. Each is substantially transparent. The first film (stiffener) forms an open ended rectangular cylinder, the major dimension of the first film being from about 95% to about 105% of the major dimension of the soap bar. This allows the first film to provide structural protection for the soap bar, but yet to allow a second film (wrapper) to fully envelope the soap bar and first film. This second film is sealed to itself at the ends and on one major panel aligned with the major axis of the soap bar. The soap bar itself provides the surface to which the second film is sealed against. These seals can be referred to as "lap" seals.

The first (stiffener) film has a thickness that is about 2:1 to about 5:1 times greater than the second film (wrapper) and preferably about 3:1 to 4:1. The stiffness of the first film over the second film is about 7:1 to 35:1 times greater than the first film and preferably about 12:1 to about 24:1. The tear strength of the second film will be about 5:1 to 10:1 times greater than the first film. And the moisture vapor transmission of the entire package will be less than about 3 $gm/m^2/$ day. This packaging is not susceptible to mold growth and it has greater puncture resistance.

This package allows a soap bar to be fully viewed through the packaging. This is particularly useful in packaging colored, striated and translucent soap bars. Such soap bars are inherently decorative. This obviates the need for artwork on the packaging film to attract customers. The soap bars in and of themselves can be decorative, translucent or opaque. The intrinsic value of the product is visually conveyed to the customer quickly on the shelf. The customer does not have to purchase the product and wait till later to view the soap bar attributes.

In addition there is the packaging advantage that the package has a generally rectangular shape with greater shape integrity. This makes it easier to stack the packaged soap bars on store shelves. It also provides a shape where the soap bars can easily be combined into larger packs through banded or shrink-wrap units. The rectangular shape with greater shape integrity has these and other advantages.

DETAILED DESCRIPTION OF THE INVENTION

The soap bars that are to be packaged are generally ovoid or rectangular in shape. These can be fully rectangular, rectangular with rounded edges, or a saddle shape with rounded edges. A saddle shape is a shape where the soap bar along the major axis is convex on one side and concave on the other side.

The present soap packaging is primarily directed to soap bars that contain a unique design feature. This can be a design on the bar, a unique structure to the bar, such as a striated bar having elongated sections of different colors and colored translucent and transparent bars. It is desirable in marketing these bars to use a transparent package. However, he package also must be able to physically protect the soap bar, to provide a barrier to prevent loss of moisture and fragrance from the soap bar, and to prevent contamination from the environment. This is accomplished in the present two film layer packages.

Figure 1:
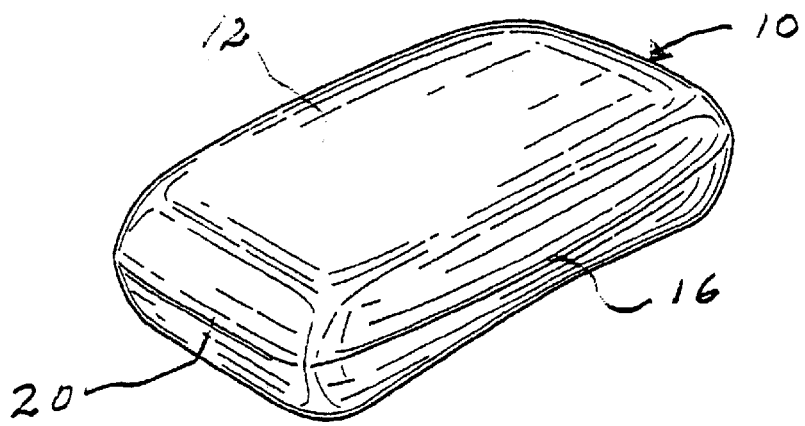
FIG. 1 is a perspective view of a soap bar to be packaged.
Figure 2:
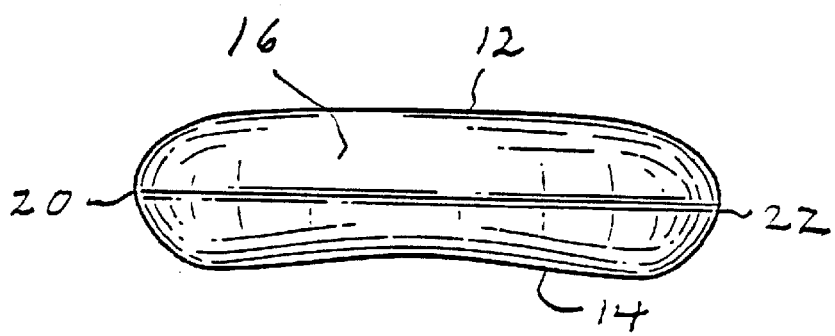
FIG. 2 is a side elevation view of the soap bar along the major axis.
Figure 3:
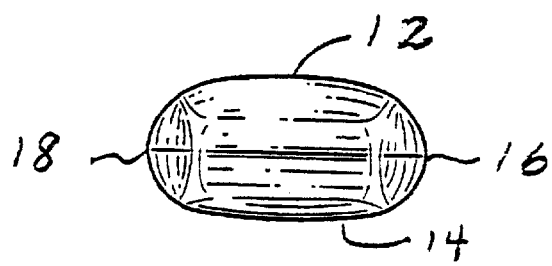
FIG. 3 is a side elevation view of the soap bar along the minor axis.

The invention will be described in more detail with specific reference to the preferred embodiments set out in the drawings. FIGS. 1 to 3 show a generally rectangular soap bar 10. This is a preferred embodiment of the soap bar and has rounded surfaces with no sharp edges. However it can be perfectly rectangular with sharp or beveled edges. Further as shown the preferred soap bar has a concave lower surface. The soap bar as shown in this preferred embodiment has a top surface 12, a lower surface 14, side surfaces 16 and 18, and end surfaces 20 and 22. As noted the lower surface in this preferred embodiment is concave in shape.

Figure 4:
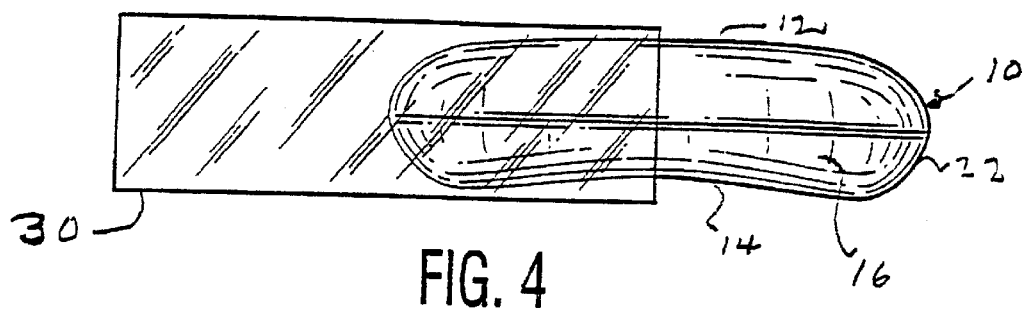
FIG. 4 is a side elevation view of the soap bar partially enveloped in a first film (stiffener).
Figure 5:
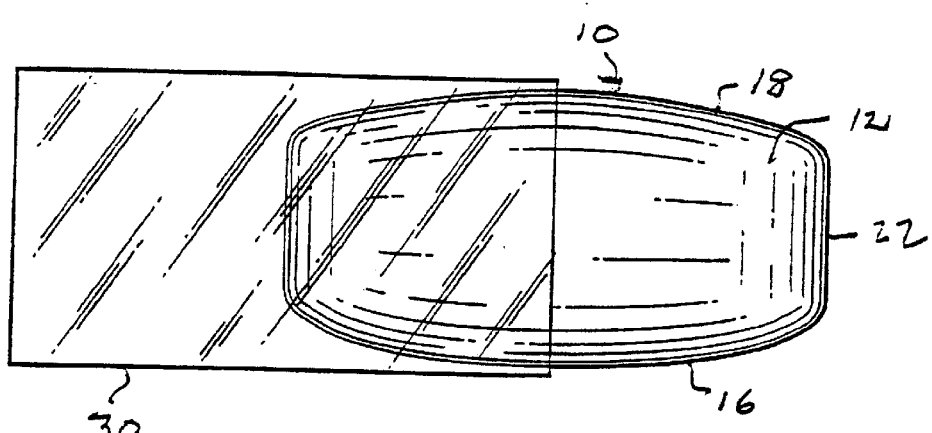
FIG. 5 is a top plan view of the soap bar partially enveloped in a stiffener sheet.

FIGS. 4 and 5 show the soap bar 10 partially within a first relatively thick inner stiffener film 30. FIG. 4 is a side elevation view of the soap bar partially within the film 30 and FIG. 5 is a top elevation view of the soap bar of FIG. 4. The film 30 preferably fully envelopes the soap bar except for the ends. It forms a rectangular channel around the soap bar. However the film need not be continuous. It may be formed from a cut sheet of film and have abutting or overlapping ends. Also there can be a gap between the sheet ends. In any such form the relatively thick film will protect the soap bar and provide a firm edge which can allow crisp folds and good end sealing of the second barrier film layer.

Figure 6:
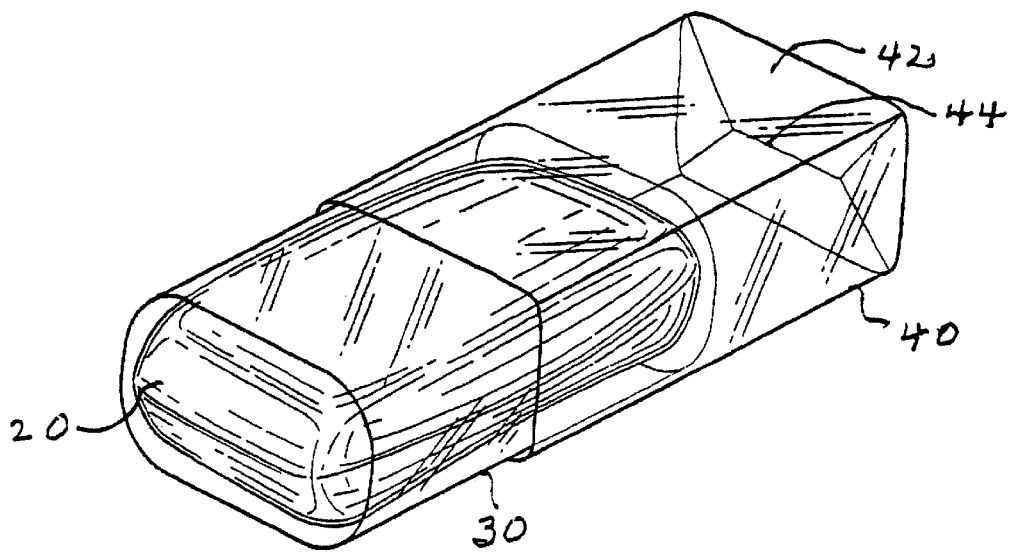
FIG. 6 is a perspective view of the soap bar fully enveloped in a stiffener and partially enveloped in an over wrap film.
Figure 7:
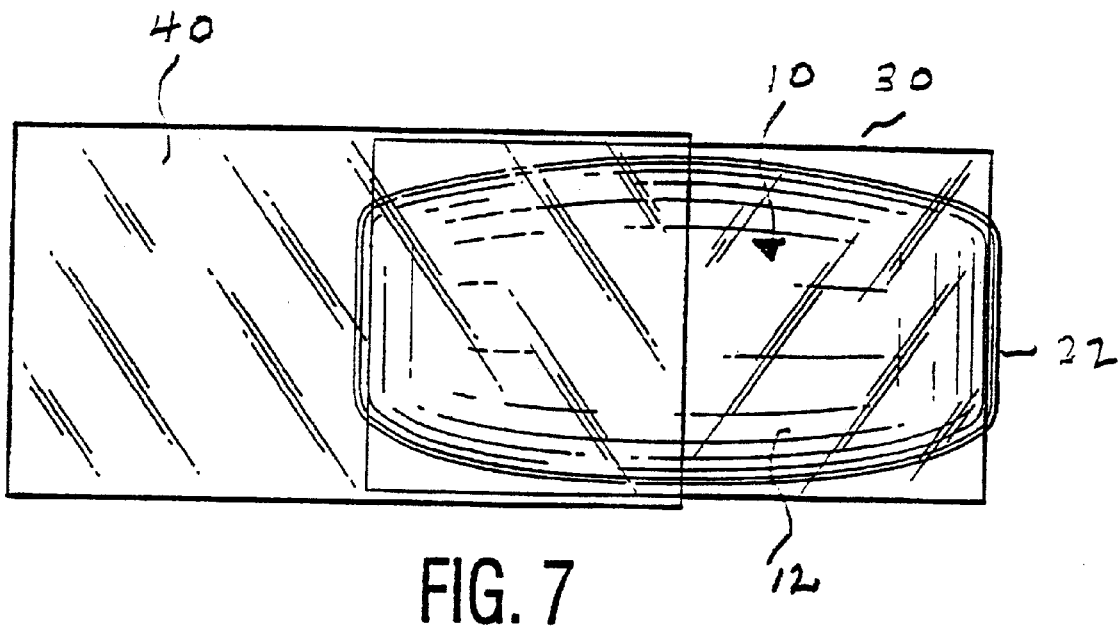
FIG. 7 is a top plan view of the packaged soap bar of FIG. 6.
Figure 8:
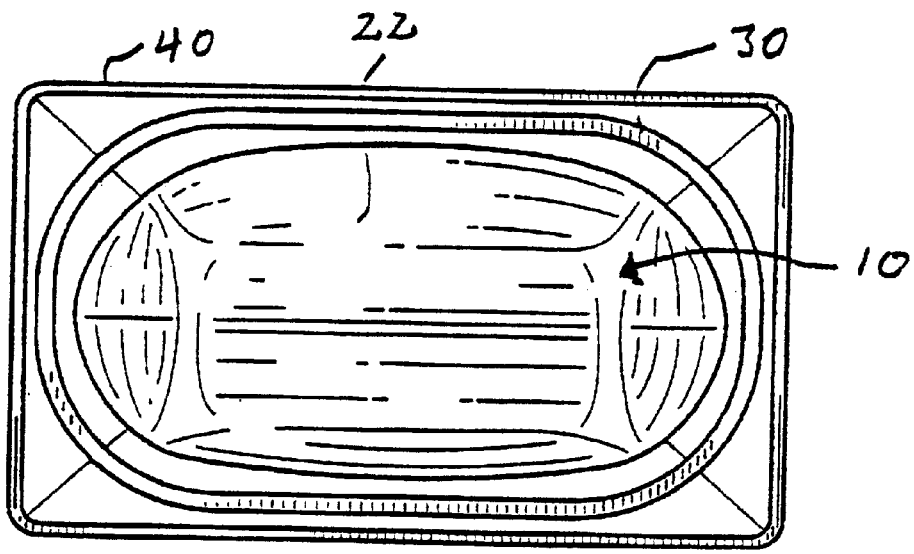
FIG. 8 is a side elevation view of the packaged soap bar along the minor dimension fully within the package prior to sealing the second end.

FIG. 6 shows the soap bar enveloped in the first film 30 and partially placed in the second outer wrapper barrier film. The second film 40 primarily is a barrier film and this film will fully envelope the soap bar. The end 42 of the second film is closed by a fold over or lap seal 44. However any type of seal can be used. The other end is sealed in the same manner. These seals can be made with heat or adhesives. In forming the end seals, the sides 20 and 22 of the soap bar are used as a support against which an exterior machine part applies pressure and heat to the second film 40 to form the seal. FIG. 7 is a top plan view of the soap bar and film structures of FIG. 6. FIG. 8 is an end view of the soap bar with the first film and second film prior to the folding over and sealing of the end of the package.

The inner stiffener first film should be a substantially transparent film. Suitable films are polyvinyl chloride (PVC) films and polyethylene terephthalate (PET) films. Other suitable films that are substantially transparent are polystyrene and polypropylene. The films should have a tear resistance of more than about 50 grf (grams force), a light transmittance of more than about 85%, preferably more than about 90% and a clarity of more than 90%, preferably more than about 95%. These optical characteristics can be modified according to the marketing need, i.e., a more translucent character may be employed. The tensile strength should be more than about 35 MPa in each of the machine direction and the cross direction. In comparison, paper stiffeners have a tensile strength of about 20 MPa to about 30 MPa.

The thickness of the stiffener film can be from about 100 microns (4 mils) to 325 microns (12 mils), and preferably about 125 microns (5 mils) to about 250 microns (10 mils). The particular thickness used also will depend on the stiffness of the film and its tensile strength.

The outer film layer preferably is a biaxially-oriented polypropylene (BOPP) film laminated to another biaxially-oriented polypropylene film (BOPP/BOPP). Clear acrylic tie adhesives are used to form the laminates. However, other films such as single layer clear polyolefins, such as BOPP, and PET laminates and other clear sealable films can be used. Any film that is used should have high moisture barrier and fragrance barrier properties. In addition, since this film is to be the outer film that is susceptible to wear it should have good tensile strength properties. The tensile strength should be more than about 150 MPa, and preferably more than about 200 MPa in the machine direction and more than about 75 MPa, and preferably more than about 100 MPa in the cross direction.

EXAMPLE 1

The relatively thick film 12 was tested for tear strength in the machine direction (MD) and the cross direction (CD). Polyvinyl chloride (PVC) and a polyethylene terephthalate (PET) films were tested and compared to paper stiffener material. The PVC and PET stiffeners have a higher tear strength in a comparison to the paper stiffeners as is illustrated in Table 1.

TABLE 1

| | Elmendorf Tear Test (grf) | |
|---|---|---|
| Films | Machine Direction (MD) | Cross Direction (CD) |
| PET Stiffener - 7.5 mils | 82.1 | 91.2 |
| PET Stiffener - 10.0 mils | 144.0 | 148.8 |
| PVC Stiffener - 5.0 mils | 30.4 | 54.4 |
| PVC Stiffener - 7.5 mils | 64.0 | 94.4 |
| Paper Stiffener | 24.0 | 27.2 |

The tear test was conducted using the notched technique following TAPPI method T-414 om-88. The tear test showed the superiority of the PVC and PET stiffeners over paper stiffeners.

EXAMPLE 2

All of the films were tested for % haze, % light transmission and clarity using ASTM method D-1003. In addition, the overwrap film also was tested for surface gloss. The comparative data is given in Table 2.

TABLE 2

| FILMS | HAZE % | TRANS-MISSIVITY % | CLARITY % | GLOSS @ 60° |
|---|---|---|---|---|
| BOPP/BOPP - 2 mil plastic soap wrapper | 1.91 | 95.6 | 98.3 | 186.2 |

TABLE 2-continued

| FILMS | HAZE % | TRANS-MISSIVITY % | CLARITY % | GLOSS @ 60° |
|---|---|---|---|---|
| PET Stiffener - 7.5 mils | 1.78 | 92.9 | 99.6 | n/a |
| PET Stiffener - 10.0 mils | 1.53 | 92.8 | 99.6 | n/a |
| PVC Stiffener - 5.0 mils | 1.54 | 93.1 | 96.9 | 784.8 |
| PVC Stiffener - 7.5 mils | 1.90 | 92.0 | 97.1 | 180.4 |
| Paper Wrapper | n/a | 14.7 | 0 | 73.9 |
| Paper Stiffener | n/a | 10.5 | 0 | n/a |

Table 2 shows the relative optical properties of the traditional wrapping materials and new PVC and PET films It also is shown that the outer enveloping film has a greater gloss that a paper film wrap. The PVC, PET, and BOPP laminate films all provide a superior appearance when used on decorative soap bars such as translucent and transparent soap bars. The ability to see the product inside the pack is about 100%.

EXAMPLE 3

The films were tested for the rate of moisture vapor transmission (MVTR). The tests were performed on MOCON test equipment at 100° F., 100% RH and a 10 std. cc/min. flow rate of nitrogen. The MVTR values in grams per square meter per day are given in Table 3.

TABLE 3

| FILMS | MOISTURE VAPOR TRANSMISSION RATE (MVTR) |
|---|---|
| BOPP/BOPP Laminated - 2 mil | 2.591 |
| PET Stiffener - 7.5 mils | 7.022 |
| PET Stiffener - 10.0 mils | 6.026 |
| PVC Stiffener - 5.0 mils | 7.496 |
| PVC Stiffener - 7.5 mils | 4.364 |
| BOPP/Paper Wrapper | 2.247 |
| Paper Stiffener | Failed |

It is seen from this data that the outer wrap all BOPP laminate film was not much different than the BOPP/paper wrapper. However, the inner wrap (stiffener) films provide a high moisture barrier compared to the paper stiffener which provides essentially none.

EXAMPLE 4

The films were tested for tensile strength in the machine direction (MD) and the cross direction (CD). The tests were conducted using the ASTM Method D-882. The tensile strength in mega pascals per 12.7 mm width is set out in the following Table 4.

TABLE 4

| | Tensile Strength Mpa/12.7 mm width | |
|---|---|---|
| Films | Machine Direction (MD) | Cross Direction (CD) |
| BOPP/BOPP - 2 mil plastic wrapper | 234 | 120 |
| PET Stiffener - 7.5 mils | 61 | 61 |
| PET Stiffener - 10.0 mils | 53 | 42 |
| PVC Stiffener - 5.0 mils | 61 | 60 |
| PVC Stiffener - 7.5 mils | 46 | 44 |
| Paper Wrapper | 49 | 26 |
| Paper Stiffener | 21 | 15 |

It is seen that the tensile strength of the PVC or PET inner film is greater than that of a paper stiffener and that the tensile strength of the outer film BOPP/BOPP film is greater than a paper laminate wrapper. This is the case for both the machine direction and the cross direction.

EXAMPLE 5

The films were tested for stiffness using a Taber Stiffness Tester. Table 5 provides comparison data for the films at a given thickness in the machine direction (MD) and in the cross direction (CD).

TABLE 5

| FILMS | THICKNESS (Microns) | STIFFNESS (MD) | STIFFNESS (CD) |
|---|---|---|---|
| BOPP/BOPP | 56 | 1.6 | 2.1 |
| PET Stiffener | 196 | 28.3 | 33 |
| PET Stiffener | 264 | 59 | 66.5 |
| PVC Stiffener | 117 | 14.1 | 13.9 |
| PVC Stiffener | 785 | 34.7 | 37 |

The Tables provide the data upon which the structure of the inner stiffener layer and the barrier outer layer are predicated. It was found that the inner stiffener layer should have a thickness of about 5 mils to about 10 mils while the outer barrier film can have a thickness of about 1 to 3 mils. The preferred thickness of the inner stiffener film is about 7.5 mils and the preferred thickness of the outer barrier film is about 2 mils. The transmissivity for each film should be more than about 85% and preferably more than about 90%. The clarity of the inner stiffener film and outer barrier film should be more than about 90% and preferably more than about 95%. This will provide a package soap bar that can be readily seen prior to a purchase decision. Further, this package has the advantage of no mold formation. The paper stiffeners absorb moisture from the soap bar and provide a good mold growth medium. This requires the use of mold inhibitors in the use of paper stiffeners in soap bar packaging. Also, paper stiffeners lose their integrity as they absorb moisture from the soap bar.

What is claimed is:

1. A soap bar packaged in a transparent package comprising a soap bar, said soap bar having a generally rectangular shape with two sides of a minor dimension and two sides of a major dimension, a first substantially transparent inner film having a light transmission of more than about 85% and a clarity of more than about 90% substantially enveloping said soap bar and open on the two sides of a minor dimension, a second substantially transparent outer film overlaying said first film and fully enveloping said soap bar, the thickness of said first film to said second film being aboutb 2:1 to about 5:1, said soap bar being translucent.

2. A soap bar as in claim 1 wherein said first film and said second film are selected from the group consisting of polyvinyl chloride polypropylene and polyethylene terephthalate films.

3. A soap bar as in claim 2 wherein said first film is a polyethylene terephthalate film and said second film is a biaxially oriented polypropylene film.

4. A soap bar as in claim 3 wherein said second film is a laminate of two layers of biaxially oriented polypropylene.

5. A soap bar as in claim 2 wherein said first film is a polyvinylchloride film and said second film is a biaxially oriented polypropylene film.

6. A soap bar as in claim 5 wherein said second film is a laminate of two layers of biaxially oriented polypropylene.

7. A soap bar as in claim 1 wherein the thickness of said first film to said second film is about 3:1 to about 4:1.

8. A soap bar as in claim 1 wherein the stiffness of said first film to said second film is about 7:1 to about 35:1.

9. A soap bar as in claim 8 wherein the stiffness of said first film to said second film is about 12:1 to about 24:1.

10. A soap bar as in claim 1 wherein the tear strength of said first film to said second film is about 5:1 to about 10:1.

11. A soap bar as in claim 1 wherein the moisture vapor transmission of said transparent package is less than 3 gm/m$^2$/day.

12. A soap bar as in claim 1 wherein said first film and said second film have a light transmission of more than about 85%.

13. A soap bar as in claim 1 wherein said first film and said second film have a clarity of more than about 90%.

14. A soap bar as in claim 1 wherein said soap bar wherein a cross-sectional dimension of said soap bar across said major dimension at a midpoint thereof is greater than a cross-sectional dimension across said major dimension adjacent the ends thereof.

15. A soap bar as in claim 1 wherein said soap bar is a colored translucent soap bar.

16. A soap bar as in claim 1 wherein said soap bar is striated in at least two colors.

17. A soap bar as in claim 1 wherein said soap bar is a colored soap bar.

18. A soap bar as in claim 1 wherein said first film is a polyethylene terephthalate film, said second film is a two layer laminate biaxially oriented polypropylene film and said soap bar is a translucent soap bar.

19. A soap bar as in claim 1 wherein said first film is a polyvinylchloride film, said second film is a two layer laminate biaxially oriented polypropylene film and said soap bar is a translucent soap bar.

20. A soap bar as in claim 17 wherein said soap bar is a colored translucent soap bar.

* * * * *